United States Patent
Stone

(10) Patent No.: US 7,309,039 B1
(45) Date of Patent: Dec. 18, 2007

(54) FISHING REEL POWER DEVICE

(76) Inventor: James W. Stone, 363 Broadview La., Annapolis, MD (US) 21401

( * ) Notice: Subject to any disclaimer, the term of this patent is extended or adjusted under 35 U.S.C. 154(b) by 0 days.

(21) Appl. No.: 11/458,252

(22) Filed: Jul. 18, 2006

(51) Int. Cl.
*A01K 89/01* (2006.01)

(52) U.S. Cl. .................. 242/225; 242/323; 242/257

(58) Field of Classification Search ............... 242/323, 242/223, 225, 257, 259
See application file for complete search history.

(56) References Cited

U.S. PATENT DOCUMENTS

| | | | | |
|---|---|---|---|---|
| 3,126,166 A | * | 3/1964 | Weinberg | .................. 242/250 |
| 4,283,025 A | | 8/1981 | Whisenhunt | |
| 4,517,760 A | | 5/1985 | Randle | |
| 4,598,878 A | | 7/1986 | Steffan | |
| 4,951,890 A | * | 8/1990 | Sossamon | ................ 242/486.8 |
| 4,962,901 A | | 10/1990 | Shirley et al. | |
| 5,394,815 A | * | 3/1995 | Hansen | ........................ 114/109 |
| 5,556,047 A | | 9/1996 | Nanbu | |
| 6,015,111 A | | 1/2000 | Berke | |
| 6,126,104 A | * | 10/2000 | Kellerman | ................... 242/225 |
| 6,685,125 B1 | * | 2/2004 | Tucci | ...................... 242/390.8 |
| 7,086,622 B1 | * | 8/2006 | Whaley | ...................... 242/323 |
| 2003/0168546 A1 | | 9/2003 | Bankston | |

* cited by examiner

*Primary Examiner*—Emmanuel M Marcelo
(74) *Attorney, Agent, or Firm*—Lawrence E. Laubscher, Jr.

(57) ABSTRACT

A fishing reel power device is characterized by a variable speed motor and adapter combination which can be used with a conventional fishing reel for automatically winding the same. The adapter includes either recesses for receiving the handle and counterweight of a fishing reel crank and/or a pair of projections which engage the crank. A further recess in the end of the adapter receives a nut on the reel to align the device with the reel. The motor is activated by a switch to rotate the adapter and thus the reel crank. The adapter is designed to retain the engaged portions of the reel with a gripping force which increases as the load on the motor increases. Once winding is complete, the adapter is easily disengaged from the reel so that the reel is available for manual operation.

5 Claims, 5 Drawing Sheets

FISHING REEL POWER DEVICE

BACKGROUND OF THE INVENTION

The sport of fishing has evolved greatly over the years such that there are now many types of fishing, each with a somewhat unique set of equipment. For example, deep sea fishing is conducted at depths up to 400 feet with heavy sinkers. This requires a heavy rugged powered reel to retrieve line quickly while minimizing operator fatigue. Such reels are not capable of manual operation.

Inshore fishing provides different needs and different equipment. The fish being caught and the weights required for fishing in shallower waters do not require powered reels. In fact, the thrill of reeling in a hooked fish is one of the joys of inshore fishing. Nevertheless, many boats troll inshore waterways with up to twenty rods, each with 300 to 400 feet of line out. At the end of the day, reeling in those lines is physically demanding, particularly since the boat must be in motion to prevent the lines from going slack and tangling.

The present invention relates to a power device which can be used with conventional fishing reels to reel in a fishing line with little or no effort. The device is removably connected with the reel so that a single device can successively reel in a number of lines.

BRIEF DESCRIPTION OF THE PRIOR ART

Electric motor drives for fishing reels are well known in the patented prior art. The Weinberg U.S. Pat. No. 3,126,166, for example, discloses such a drive in which a hand held gear motor has an adaptor with a pair of drive pins which mate with holes in the crank of a fishing reel. A major drawback to this drive mechanism is that the cranks of fishing reels do not contain holes to receive the pins and owners of such reels are reluctant to disassemble the reel and drill the necessary holes. Moreover, it is difficult to retain the pins in the holes of the reel crank, particularly when the boat is rocking in rough water. If the device is used without drilled holes, the pins do not sufficiently grasp the crank and the motor drive has a tendency to slip off center, thereby inhibiting its ability to consistently rotate the crank to reel in a line.

Other drive assemblies for fishing reels are disclosed in the Shirley et al U.S. Pat. No. 4,962,901, the Berke U.S. Pat. No. 6,015,111 and the Randle U.S. Pat. No. 4,517,760. Each of these assemblies has its drawbacks. The Shirley device, like Weinberg, requires modification to an existing fishing reel and also impedes the ability of the reel to be used manually when a fish is on the line. The Berke device is for winding line on new reels and is not suitable for use on a boat to reel in a fishing line. The Randle device includes an elaborate triggering mechanism which senses when a fish strikes the line and then activates the motor to reel in the fish. This does not provide for any manual reeling in of the fish.

The present invention was developed in order to overcome these and other drawbacks of the prior devices by providing a fishing reel power device which is removably connected with a fishing reel to rotate the crank on the reel to retrieve fishing line without modifying the reel.

SUMMARY OF THE INVENTION

According to the invention, the fishing reel power device includes a motor having a spindle which is rotated when the motor is activated and an adaptor connected with the spindle. The adaptor releasably engages the reel crank or handle in such a manner that when the motor is activated, the adaptor grips the reel crank or handle with a gripping force which increases as the load on the motor increases to reel in an extended fishing line.

In a first embodiment, the adaptor includes diametrically opposed recesses in opposite surfaces for receiving the handle and counterweight provided on the opposite ends of the crank of the reel. The recesses are preferably tapered to assist the adaptor in centering the handle and counterweight and increasing the torque on the handle and recess as the rotational speed of the motor increases. In addition, the adaptor includes a central recess in the end of the adaptor for receiving the nut which fastens the crank to the fishing reel. The central recess assists with alignment of the adaptor with the reel.

In a second embodiment, the adaptor includes an end surface having a pair of diametrically opposed projections for engaging the crank in an area between the nut and the handle and counterweight, respectively. The projections may be in the form of rigid flaps arranged at an angle to the adaptor surface, hooks extending from the surface, or pedestals having inversely tapered conical portions. Regardless of the configuration of the projections, they are designed to fit under the rearward edge of the crank to engage the crank with a force which turns the crank and pulls the adaptor tighter against the crank as the load increases.

In a third embodiment, both diametrically opposed recesses and diametrically opposed projections are provided on the adapter. The recesses and projections are offset from each other by 90 degrees so that the operator may select whether the adapter is being used to grip the reel handle and counterweight via the recesses or to grip the crank via the projections.

BRIEF DESCRIPTION OF THE FIGURES

Other objects and advantages of the invention will become apparent from a study of the accompanying drawing, in which.

DETAILED DESCRIPTION

Figure 1:
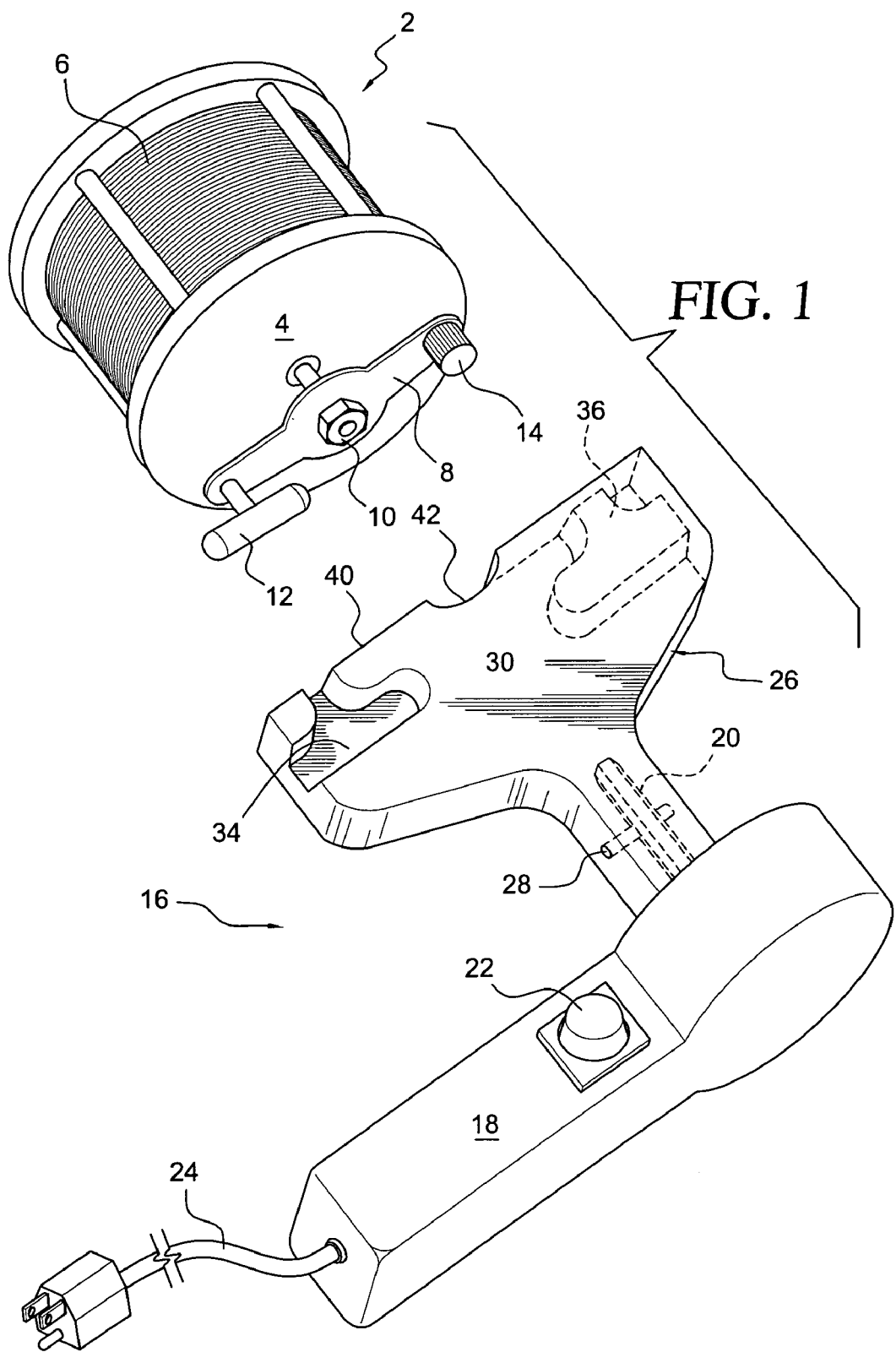
FIG. 1 is a perspective view of a fishing reel and the power device for the reel according to a first embodiment of the invention.

Referring first to FIG. 1, there is shown a fishing reel 2 with which the invention is intended for use. As is known in the art, the reel includes a central hub or axis (not shown) rotatably connected with a housing 4 and about which fishing line 6 is wound. A crank 8 is connected with the axis via an adjustable clutch mechanism (not shown) and a nut 10. A handle 12 and counterweight 14 are connected with opposite ends of the crank. With the clutch mechanism released, line is allowed to unwind from the reel. With the clutch mechanism engaged, the crank is rotated by the handle to wind the line about the hub.

The power device 16 according to a first embodiment of the invention includes a motor 18 which rotates a spindle 20 extending therefrom. The motor is preferably a variable speed electric motor and includes a trigger switch 22 to activate the motor and to control the motor speed. The motor may be battery powered or may include a cord 24 for connection with an electrical outlet.

An adapter 26 is connected with the motor spindle 20 in a conventional manner. For example, for permanent connection between the adapter and spindle, the adapter contains a hole in one end thereof for receiving the spindle and a pin 28 passes through the adapter and spindle. If a removable connection is desired, a screw or chuck may replace the pin so that the adapter can be released from the spindle.

Figure 2:
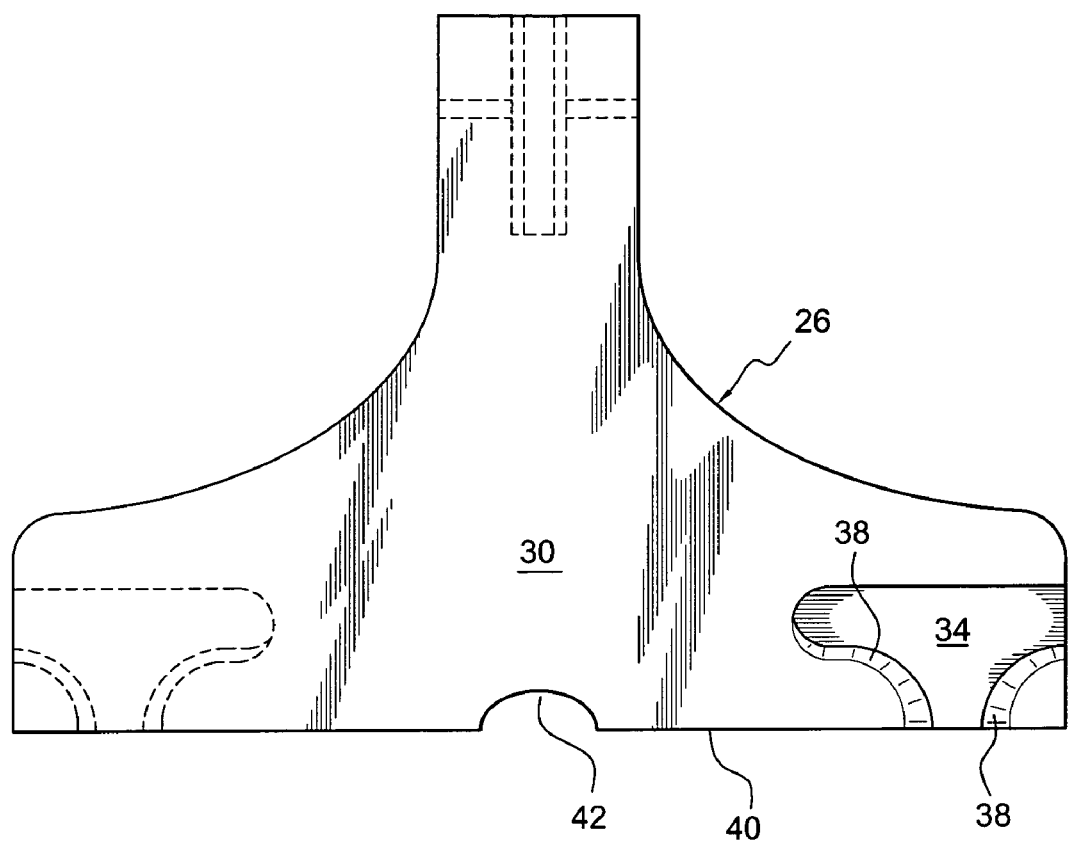
FIG. 2 is a top plan view of the adapter according to the first embodiment of the invention.
Figure 3:
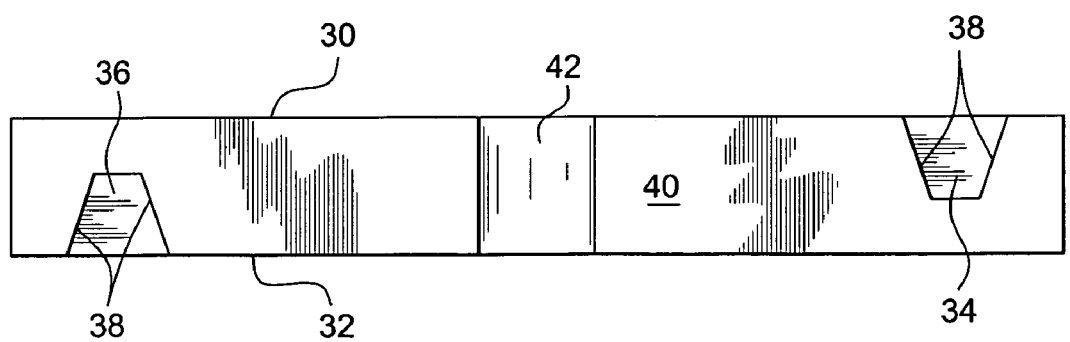
FIG. 3 is a front plan view of the adapter of FIG. 2.

As shown in FIGS. 2 and 3, the adapter 26 has upper 30 and lower 32 surfaces which contain recesses 34, 36. The recesses have the same configuration so that they can receive either the handle 12 or the counterweight 14 of the fishing reel. More particularly, the recesses have tapered surfaces 38 which serve to center the handle and counterweight within the recesses as the motor is operated. The tapered surfaces 38 contact the inside edge of the handle to prevent disengagement while the motor is running. In addition, the adapter includes an end surface 40 opposite the end which is connected with the spindle. The end surface contains a central recess 42 for receiving the nut 10 on the reel. Of course, reels without a counterweight or with a counterweight in a different position can be accommodated by spacing the recesses appropriately. Any two protrusions on the crank can be used to engage the adapter. The crank nut 10 is representative of any protrusion such as a bolt head or other extension of the crank axle. The adapter could engage the handle and counterweight, the handle and crank nut, or the crank nut and counterweight or other protrusion.

In use, the power device 16 of the first embodiment is positioned against a fishing reel with the handle and counterweight of the reel crank arranged within the recesses 34 and 36. The reel nut 10 is also positioned within the recess 42 to center the power device relative to the reel. When properly positioned, the spindle 20 of the power device is aligned with the axis of the reel hub. The switch 22 is operated to activate the motor 18. Further depression of the switch increases the speed of the motor to rotate the crank and wind the fishing line on the reel. As the speed of rotation increases, the torque on the handle and counterweight cause them to be retained in the associated recesses. When the fishing line has been reeled in, the motor is deactivated and the power device may be removed from the reel. Further manual winding of the reel can be accomplished as necessary to stow the reel.

Figure 4:
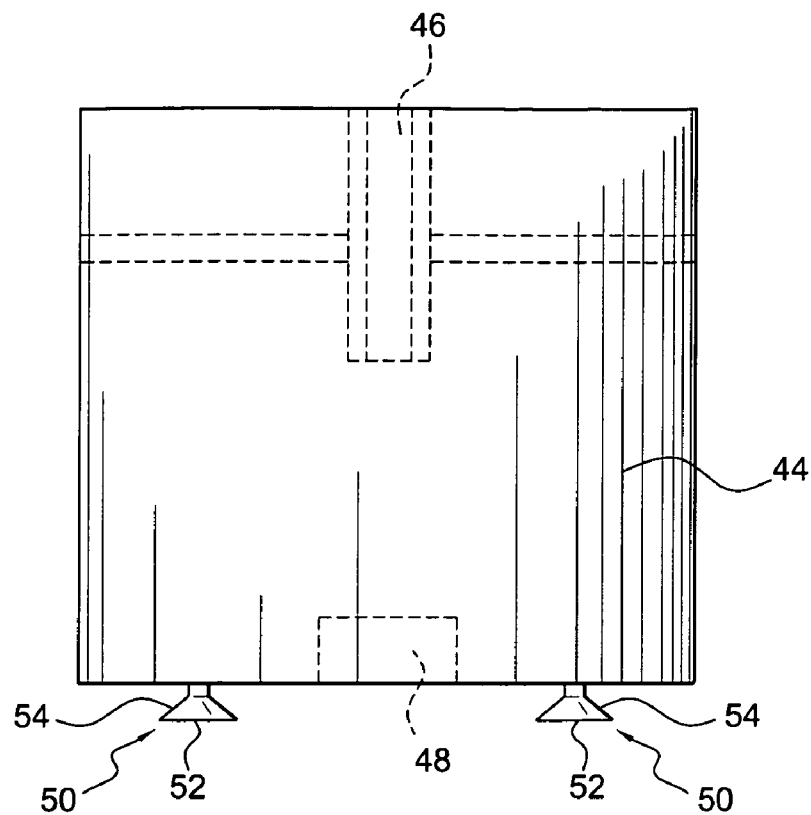
FIG. 4 is a top plan view of the adapter according to a second embodiment of the invention.
Figure 5:
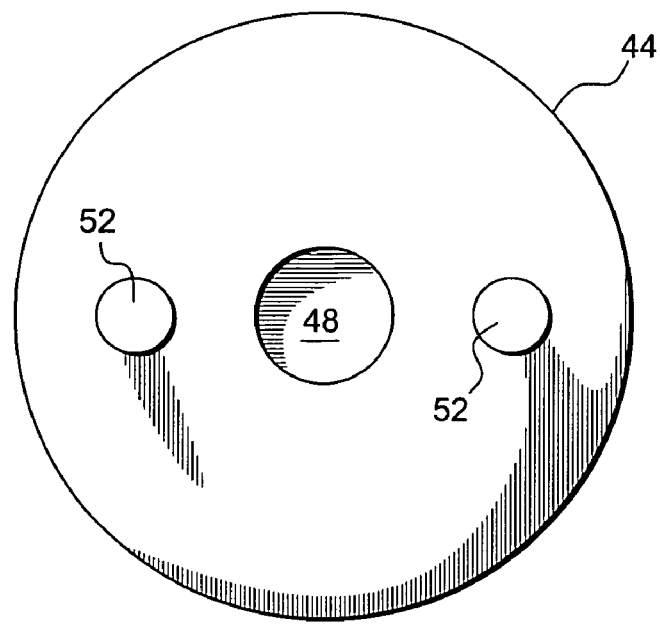
FIG. 5 is a front plan view of the adapter of FIG. 4.
Figure 6:
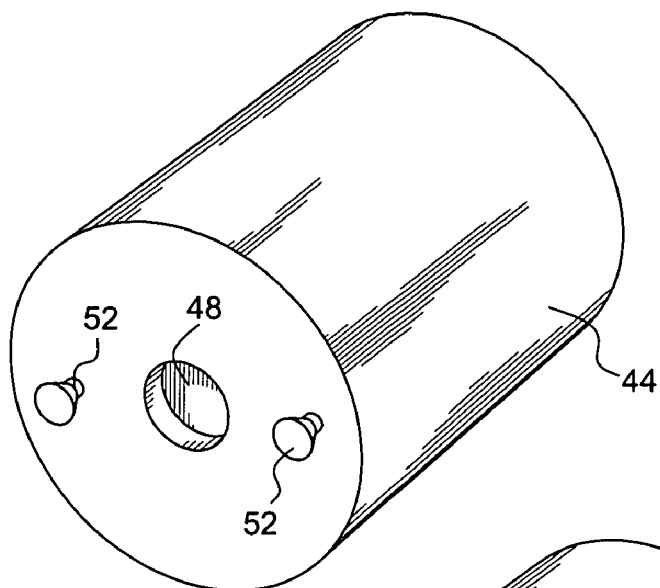
FIGS. 6, 7, and 8 are perspective views showing different types of projections, respectively, for the adapter according to the second embodiment of the invention.
Figure 7:
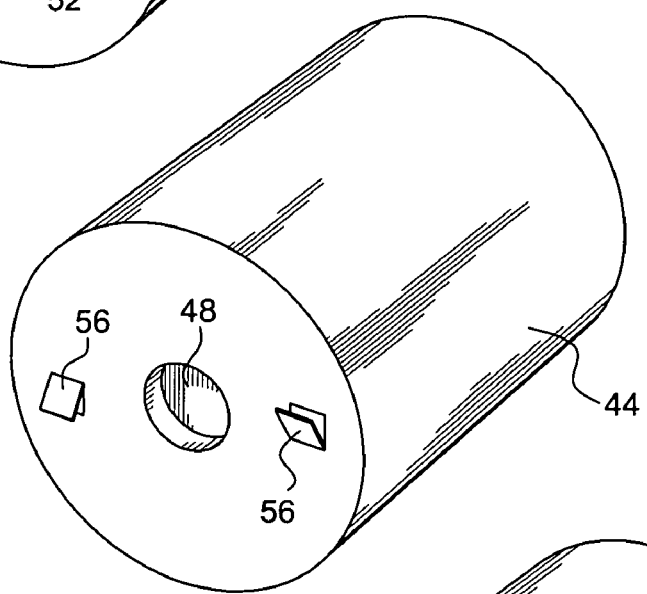
Figure 8:
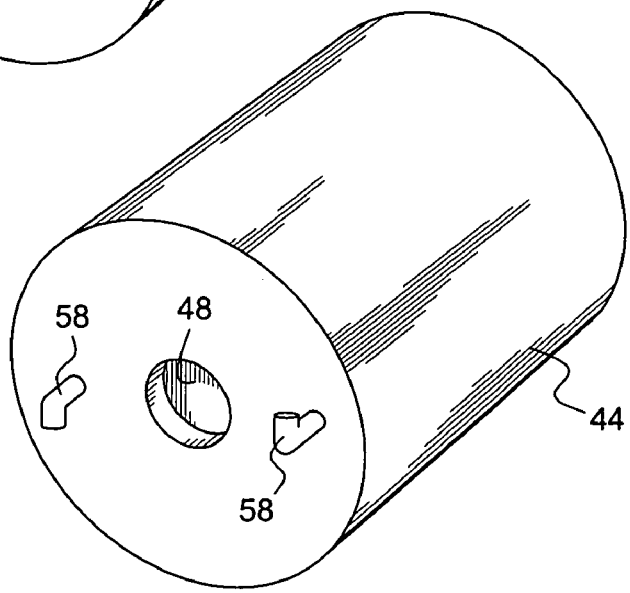

According to a second embodiment, a modified adapter is connected with the motor spindle. Referring to FIGS. 4-6, the second embodiment of the adapter is shown. The adapter 44 includes a hole 46 at one end for receiving the spindle of the motor. The other end surface of the adapter contains a central recess 48 for receiving the reel nut 10 and a pair of projections 50 extend from the surface. As shown in FIG. 5, the projections are diametrically opposed on the surface on opposite sides of the recess 48. In the embodiment shown in FIGS. 4-6, the projections are in the form of pedestals 52 having an inversely tapered bottom surface 54 such as would be defined by the head of a flat head screw. Alternate configurations for the projections could be rigid tabs 56 as shown in FIG. 7 or hooks 58 as shown in FIG. 8.

The pedestal, tab or hook projections all operate in the same manner. That is, the adapter 44 is positioned against the crank 8 of a fishing reel with the projections passing behind and beneath the rear edge of the crank. When the motor is activated, the projections force the crank to rotate in the direction to reel in the fishing line. The greater the load, the greater the grip of the projections on the crank. When reeling is finished and the motor is stopped, the adapter can easily be removed from the reel crank.

Figure 9:
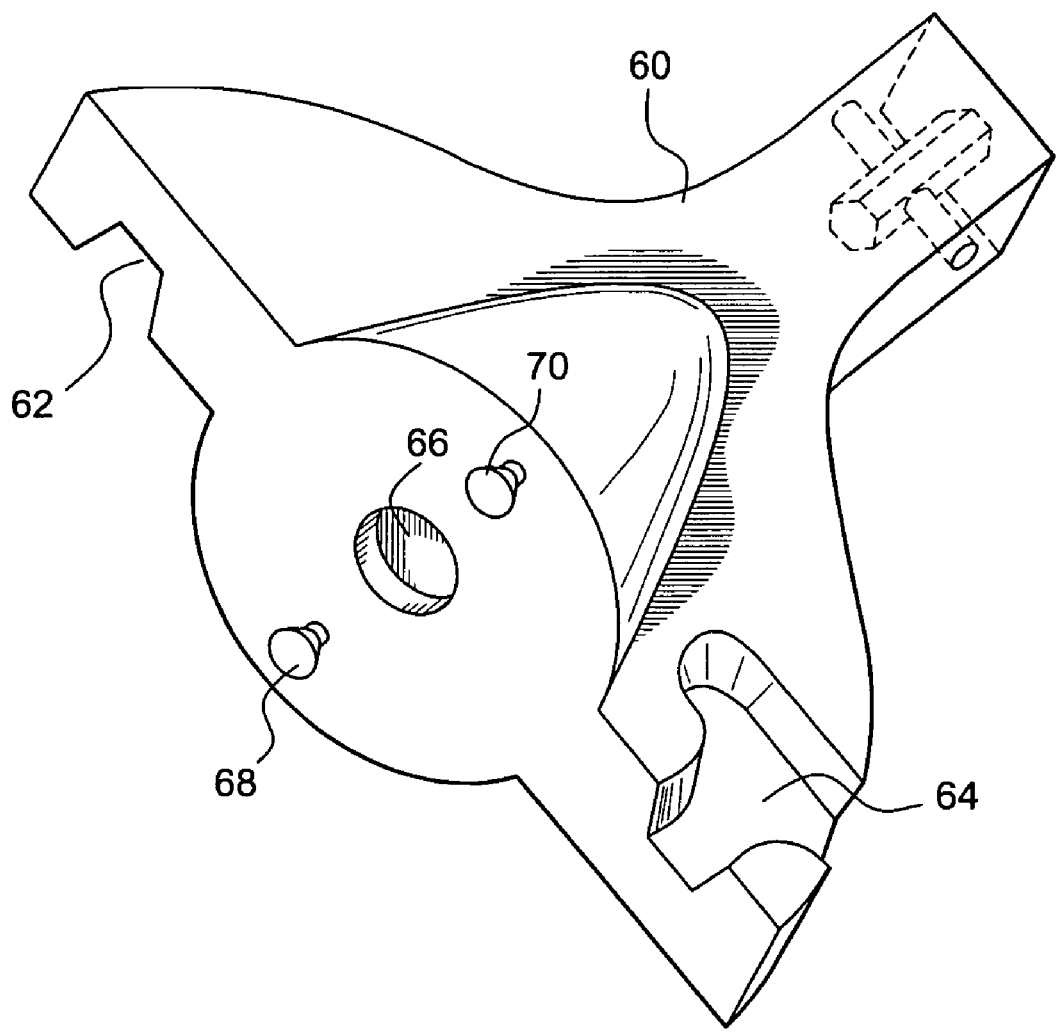
FIG. 9 is a perspective view of a further embodiment of the adapter according to the invention.

A combination of the first and second embodiments can be provided as shown by the adapter 60 shown in FIG. 9. It is configured similarly to the adapter 26 of FIGS. 1-3 in that it includes diametrically opposed recesses 62, 64 in opposite surfaces thereof for receiving at least one of the reel handle and counterweight and contains a central recess 66 in an end surface for receiving the reel nut. The end surface further includes projections 68, 70 for engaging the crank of the reel. As shown in FIG. 9, the projections 68, 70 and recesses 62, 64 are each offset by 90 degrees. Thus, the user has the option of using the recesses 62, 64 for receiving the reel handle and counterweight or the projections 68, 70 for engaging the reel crank in order to wind the fishing line on the reel.

Similarly, an adapter for use with a reel with no counterweight but a short crank extending opposite the handle may contain one recess to engage the handle and one hook to engage the rear edge of the crank.

The adapter of either embodiment can be formed of any durable rigid material such as wood, metal or synthetic plastic. Similarly, the projections can be formed of the same or similar materials.

Although the invention has been described for use in reeling in lines when fishing has been completed, the device may also be used to reel in a line with a fish on the end thereof. By adjusting the drag on the clutch mechanism of the reel, the power device can be used to land a fish in a manner similar to manually landing a fish, except that the power device provides the winding action. Thus, the fish can run and pull out more line, even when the power device is operating, depending on the setting of the drag.

While in accordance with the provisions of the patent statute the preferred forms and embodiments of the invention have been illustrated and described, it will be apparent to those of ordinary skill in the art that various changes and modifications may be made without deviating from the inventive concepts set forth above.

What is claimed is:

1. A device for powering a fishing reel having a crank with a handle and a counterweight arranged at opposite ends thereof, comprising
   (a) a motor having a spindle which is rotated when said motor is activated;
   (b) an adapter connected with said spindle, said adapter including an end surface opposite said motor spindle having a pair of diametrically opposed tapered projections for releasably engaging the reel crank on opposite sides of a nut which fastens the crank with the reel in such a manner that when said motor is activated, said adapter grips the reel crank with a gripping force which increases as the speed of rotation of said motor increases.

2. A device as defined in claim 1, wherein said projections comprise rigid flaps arranged at an angle relative to said adapter end surface for gripping the crank.

3. A device as defined in claim 1, wherein said projections comprise hooks for gripping the crank.

4. A device as defined in claim 1, wherein said projections comprise pedestals having inversely tapered conical portions for gripping the crank.

5. A device as defined in claim 1, wherein said adapter end surface contains a central recess for receiving the nut of the reel, said central recess aligning said adapter with the reel.

\* \* \* \* \*